United States Patent
Martinsen et al.

(10) Patent No.: US 12,224,572 B2
(45) Date of Patent: Feb. 11, 2025

(54) POWER COLLECTION SYSTEM FOR SUBSEA TRANSFER OF POWER FROM OFFSHORE POWER GENERATION UNITS

(71) Applicant: ABB Schweiz AG, Baden (CH)

(72) Inventors: Oistein Martinsen, Bærums Verk (NO); Harald Fretheim, Aurskog (NO); Vitor Moritsugu, Bergen (NO); Stian Ingebrigtsen, Bergen (NO); Tor-Eivind Moen, Nesoya (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/551,420

(22) PCT Filed: Mar. 25, 2022

(86) PCT No.: PCT/EP2022/057977
§ 371 (c)(1),
(2) Date: Sep. 20, 2023

(87) PCT Pub. No.: WO2022/200599
PCT Pub. Date: Sep. 29, 2022

(65) Prior Publication Data
US 2024/0332938 A1    Oct. 3, 2024

(30) Foreign Application Priority Data
Mar. 25, 2021    (EP) .................... 21164914

(51) Int. Cl.
*H02G 9/00*    (2006.01)
*F03D 13/25*   (2016.01)
*H02J 3/38*    (2006.01)

(52) U.S. Cl.
CPC ............... *H02G 9/00* (2013.01); *H02J 3/38* (2013.01); *F03D 13/256* (2023.08); *H02J 2300/28* (2020.01)

(58) Field of Classification Search
CPC .......... H02G 9/00; H02J 3/38; H02J 2300/28; F03D 13/256
See application file for complete search history.

(56) References Cited

U.S. PATENT DOCUMENTS 3,400,730 A * 9/1968 Anderson ........... E21B 33/0355
                                                          137/635
4,010,619 A * 3/1977 Hightower ............. D07B 1/147
                                                          174/113 C
(Continued)

FOREIGN PATENT DOCUMENTS

EP    3527821 A1    8/2019
WO    2013050755 A3    10/2013
(Continued)

OTHER PUBLICATIONS

Extended European Search Report; Application No. 21164914.0; Completed: Aug. 12, 2021; Mailing Date: Aug. 20, 2021; 9 Pages.
(Continued)

*Primary Examiner* — Pedro J Cuevas
(74) *Attorney, Agent, or Firm* — Whitmyer IP Group LLC

(57) ABSTRACT

The present invention relates to a power collection system for subsea collection of power from offshore power generation units, the system including: a set of power extender modules being independently arrangeable subsea in a local grid and each being connectable with a respective one of a set of offshore power generation units to collect electrical power from the respective offshore power generation units, the set of power extender modules being configured to be electrically series connected in the local grid being connectable with a power consumer.

17 Claims, 11 Drawing Sheets

(56) References Cited

U.S. PATENT DOCUMENTS

| | | | | |
|---|---|---|---|---|
| 5,382,752 | A * | 1/1995 | Reyhan | H02G 3/088 174/665 |
| 5,541,363 | A * | 7/1996 | Weise | H02G 3/088 174/653 |
| 6,867,364 | B2 * | 3/2005 | Hafskjold | H05K 5/068 174/18 |
| 6,873,063 | B1 * | 3/2005 | Appleford | B01D 19/0063 307/29 |
| 6,949,894 | B1 * | 9/2005 | Sullivan | F21S 8/00 362/101 |
| 6,985,061 | B2 * | 1/2006 | Hafskjold | H01F 27/06 336/57 |
| 7,080,996 | B2 * | 7/2006 | Ostergaard | H01R 13/523 439/589 |
| 7,176,589 | B2 * | 2/2007 | Rouquette | H04B 3/36 307/17 |
| 7,253,356 | B2 * | 8/2007 | Kiyota | H02G 3/081 361/678 |
| 7,352,961 | B2 * | 4/2008 | Watanabe | G03B 17/08 348/81 |
| 7,477,839 | B2 * | 1/2009 | Funahashi | G03B 17/08 396/25 |
| 7,787,756 | B2 * | 8/2010 | Funahashi | G03B 17/08 396/27 |
| 7,855,339 | B2 * | 12/2010 | Lin | H02G 3/121 439/535 |
| 7,880,419 | B2 * | 2/2011 | Sihler | H02M 7/521 318/504 |
| 7,952,855 | B2 * | 5/2011 | Sletten | H02B 1/305 361/605 |
| 8,111,502 | B2 * | 2/2012 | Rocke | E21B 33/0355 361/603 |
| 8,263,893 | B2 * | 9/2012 | Ronhovd | H01H 9/04 218/120 |
| 8,624,431 | B2 * | 1/2014 | Kanakasabai | H02J 3/36 307/32 |
| 8,922,054 | B2 * | 12/2014 | Sihler | H02J 7/345 307/19 |
| 9,030,042 | B2 * | 5/2015 | Zhan | H02J 1/06 307/31 |
| 9,203,218 | B2 * | 12/2015 | Boe | H02B 7/00 |
| 9,300,078 | B2 * | 3/2016 | Liu | H01R 31/06 |
| 9,343,880 | B2 * | 5/2016 | Hazel | H05K 7/14337 |
| 9,450,385 | B2 * | 9/2016 | Kristensen | H02B 13/045 |
| 9,450,412 | B2 * | 9/2016 | Schroeder | H02J 11/00 |
| 9,490,693 | B2 * | 11/2016 | Trainer | G05F 1/70 |
| 9,496,702 | B2 * | 11/2016 | Dong | E21B 41/0085 |
| 9,537,311 | B2 * | 1/2017 | Tenca | H02J 3/36 |
| 9,627,862 | B2 * | 4/2017 | Hytten | E21B 43/017 |
| 9,732,589 | B1 * | 8/2017 | Hajiaghajani | H05B 1/0244 |
| 10,072,831 | B2 * | 9/2018 | Greaney | H05K 5/0017 |
| 10,103,576 | B2 * | 10/2018 | Schroeder | H02J 3/01 |
| 11,259,430 | B2 * | 2/2022 | Liu | H05K 5/069 |
| 2005/0029476 | A1 * | 2/2005 | Biester | F16K 31/046 251/58 |
| 2006/0193615 | A1 * | 8/2006 | Funahashi | G03B 17/08 396/29 |
| 2009/0009931 | A1 * | 1/2009 | Rocke | H02J 13/00012 361/602 |
| 2009/0028535 | A1 * | 1/2009 | Funahashi | G03B 17/08 396/27 |
| 2009/0078442 | A1 * | 3/2009 | Lin | H02G 3/121 174/50.51 |
| 2009/0146603 | A1 * | 6/2009 | Sihler | H02M 7/521 318/812 |
| 2009/0200035 | A1 * | 8/2009 | Bjerkreim | E21B 43/01 166/335 |
| 2009/0226262 | A1 * | 9/2009 | Karstad | E21B 33/0385 307/151 |
| 2009/0284901 | A1 * | 11/2009 | Sletten | H02B 1/305 361/605 |
| 2010/0084925 | A1 | 4/2010 | Draper et al. | |
| 2010/0133901 | A1 * | 6/2010 | Zhang | H02J 3/36 363/35 |
| 2011/0247825 | A1 * | 10/2011 | Batho | H02J 5/00 307/17 |
| 2012/0217802 | A1 * | 8/2012 | Kanakasabai | H02M 5/4585 307/32 |
| 2012/0267955 | A1 * | 10/2012 | Zhan | H02J 1/06 307/31 |
| 2013/0026831 | A1 * | 1/2013 | Sihler | H02M 7/5387 307/19 |
| 2013/0286546 | A1 | 10/2013 | Hazel et al. | |
| 2014/0098468 | A1 | 4/2014 | Boe | |
| 2014/0347897 | A1 * | 11/2014 | Broussard | H02J 3/36 363/35 |

FOREIGN PATENT DOCUMENTS

| | | |
|---|---|---|
| WO | 2013050755 A2 | 11/2013 |
| WO | 2013182205 A1 | 12/2013 |
| WO | 2020115180 A1 | 6/2020 |
| WO | 2020141841 A1 | 7/2020 |
| WO | 2021034248 A1 | 2/2021 |

OTHER PUBLICATIONS

International Preliminary Report on Patentability; Application No. PCT/EP2022/057977 ; Completed: Dec. 12, 2022; Mailing Date: Dec. 23, 2022; 16 Pages.

PCT International Search Report and Written Opinion of the International Searching Authority; Application No. PCT/EP2022/057977; Completed: Jul. 21, 2022; Mailing Date: Jul. 29, 2022; 16 Pages.

* cited by examiner

POWER COLLECTION SYSTEM FOR SUBSEA TRANSFER OF POWER FROM OFFSHORE POWER GENERATION UNITS

TECHNICAL FIELD

The present invention relates to a power collection system for subsea transfer of power from offshore power generation units. The present invention further relates to a power extender module electrically connectable with an offshore power generation unit to collect electrical power therefrom.

BACKGROUND

Offshore power generation installations such as realized by e.g. windmills, solar power devices, and wave generated power, has over recent years increased both in size and rated power. The ongoing size and power increase with associated developments leads to logistic challenges with regards to installation and maintenance topics, in addition to the challenges related to power collection from the respective power generating installations.

In some systems, power generating installations such as wind turbines are "bottom fixed" i.e. with the turbine tower fixed to the seabed by e.g. a monopile configuration or a jacket foundation. However, this limits the use of the wind turbines to relatively shallow waters. To utilize acreage at deeper waters floating wind turbines have been developed.

With floating wind turbines, or other floating power generation installations, such as for example floating solar power, logistics in installation and power collection and, when relevant, distribution, is challenging. Switchgear and other electrical equipment are often installed in surface towers which may limit the switchgear design. Further, expanding a conventional windfarm requires connecting of subsea cables leading to relatively cumbersome installation processes.

SUMMARY

In view of the above-mentioned and other drawbacks of the prior art, it is an object of the present invention to provide a power collection system that at least partly alleviates the deficiencies with prior art. The suggested embodiments provide a power collection system for subsea transfer of power from offshore power generation units that provides for the facilitation of easier and more efficient installation of power generation unit farms.

According to a first aspect of the invention, there is provided a power collection system for subsea transfer of power from offshore power generation units.

The system comprises a set of power extender modules being independently arrangeable subsea in a local grid and each being connectable with a respective one of a set of offshore power generation units to collect electrical power from the respective offshore power generation unit, the set of power extender modules being configured to be electrically series connected in the local grid being connectable with one or more power consumer/s.

The present invention is at least partly based on the realization to adapt power extender module for subsea operation. The power extenders are thus operable under the water, for example, located on the seabed. Further, it was realized to provide individual power extender modules for each of the power generation units. In other words, a single power extender module may be arranged on the seabed and connected to its power generation unit independently of the other power extender modules of other power generation units of the present farm. For example, if a further power generation unit is added to the farm of power generation units, then a further power extender module is placed, submersed, on the seabed and connected to the local grid on the seabed. Thus, the further power extender module is connected to a cable already on the seabed. The further power generation unit is connected to its associated power extender module.

With the proposed power collection system, only a single cable needs to be added between surface power generating unit and the power collection cable (i.e. an "array cable") via the additional power extender module as a "T-connector". The proposed power collection system provides for a modular system.

In embodiments, each subsea power extender may comprise switching circuitry for controllable connection of the associated power generation unit to the local grid. When the power extender modules arranged subsea comprise the switching circuitry the design of such circuitry is not limited to tower or other surface hub constraints.

Preferably, the power extender modules are connected as a T-connector to the local grid of power extender modules.

Each power extender module may comprise a T-connection, and may comprise of at least one of communication circuitry, or supervision circuitry, or monitoring circuitry, or relaying circuitry or switching circuitry for controlled connection of the associated power generation unit to the local grid.

The power extender module is configured to receive electrical power harvested by the power generation unit and to provide the electrical power to the local grid. The power extender module allows for connecting a power generation unit to the local grid and may further include switching circuitry for controllable electrically connecting the power generation unit to the local grid and optionally for controllable electrically disconnecting the power generation unit from the local grid. The power extender module may thus serve as a controllable node between the local grid and the power generation unit, or even as an "intelligent" node if provided with suitable circuitry such as at least one of communication circuitry, or supervision circuitry, or monitoring circuitry, or relaying circuitry, or switching circuitry.

The local grid is comprised of the set of power extender modules connected in series with a seabed cable, i.e. an array cable.

Electrical power may be provided from the local grid to a power consumer. In this case the power collection system serves to distribute power from the power generation units to one or several power consumers via a local grid of power extender modules.

Advantageously, the power extender modules may each comprise a respective enclosure for accommodating the switching circuitry. The enclosure may further accommodate e.g. control circuitry, or monitoring circuitry, or relaying circuitry. The enclosure advantageously ensures for safe and reliable operation of the switching circuitry in a subsea environment. The enclosure is waterproof so that water from the surrounding sea cannot reach the switching circuitry inside the enclosure.

The enclosures may comprise electrical connections on a wet side of the enclosures for electrical connection between the power extender modules via a subsea cable arrangeable on a seabed. The wet side is on the external side of the enclosure facing the water when the power extender is arranged subsea. The wet sides of two power extenders may face each other on the seabed but not necessarily be in physical contact.

There are various conceivable ways of ensuring a safe and reliable environment for the circuitry inside the enclosures, such as including but not limited to the enclosures being oil-filled, or adapted to retain a fixed pressure, or adapted to retain a pressure of 1 atm or adapted to retain vacuum, or nitrogen-filled, oil-filled and pressure compensated, or non-pressure-compensated, or a combination thereof.

In embodiments, the power extender module may comprise an input connection for connection with the associated power generation unit, wherein the power extender module may comprise a T-type busbar connection configured for controllably connecting the input connection to the local grid. The power generating unit is connectable to the input connection for transferring harvested power to the power extender module. A T-type busbar connection advantageously enables for a daisy-chain connection of the power generation units. This provides an advantageous way of enabling single addition and installation of further power generation units to a present farm.

In embodiments, the power extender modules may each comprise a communication and control circuit for controlling the switching circuitry to connect the associated power generation unit to the local grid, and for controlling the switching circuitry to disconnect the associated power generation unit from the local grid, or to control a switching circuitry in the power generating units itself to disconnect the associated power generation unit from the local grid. The control circuitry is accessible by control stations above sea, for example via electrical wire/s or optical fiber based, series communication cable on the seabed. The communication and control circuitry provides control of the switching circuities for individual power generation units. The power extender modules may further each comprise electrical diagnostics, intelligent, and/or measurement equipment for performing e.g. diagnosis of the system and/or power generation unit.

In embodiment, the power collection system may comprise a power hub arrangeable subsea and configured to be connected to at least one local grid of subsea power extender modules for collecting power from the at least one local grid to the power consumer. A power hub may advantageously also be arranged subsea for improving the capability of building larger power collection and/or distribution systems. A power hub may comprise a subsea switchboard for allowing connection and power collection from more than one local grid of power extender modules and power generation units for subsequent transfer to one or more power consumers.

The power hub may comprise communication and control circuit for remotely controlling measurement and control equipment of the subsea power hub and for controlling switchgear for connection with the local grid, and for returning requested status information and diagnostic data to e.g. an operator center.

In embodiments, the power hub may comprise a power transformer for converting the power received from the power generation units and provide converted power to the power consumer or convert the power for e.g. high-voltage long distance transmission via a power export cable. The power hub may comprise an enclosure that is adapted to allow for subsea operation of the power transformer.

In embodiments, the power extenders may comprise a further switch for breaking the series connection to neighboring power extenders. This further switch provides for a controllable electrical connection to the local grid especially advantageous when installing a further power extender module and power generating unit to the system.

Embodiments of the present invention provides for the power extenders to be connectable in a radial topology, or in a ring topology. Thus, the power generation units may also be arranged in a radial topology, or in a ring topology.

In embodiments, the power extender modules comprise dry- or wet mated electrical connections for connection with a power generation unit and the cables in/out The power extender modules are preferably configured to be arranged on the seabed when in use.

According to a second aspect of the invention, there is provided a power extender module electrically connectable with a single offshore power generation unit to collect electrical power from the power generation unit. The power extender module is configured to be independently arranged subsea to be electrically series connected in a local grid of multiple power extender modules connectable with a power consumer.

In embodiments, the power extender module may comprise switching circuitry for controllably connecting the power generation unit to the local grid, and an enclosure for accommodating the switching circuitry, the enclosure being adapted to allow for subsea operation of the power extender module.

Further effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION

In the present detailed description, various embodiments of the present invention are herein described with reference to specific implementations. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the scope of the invention. In the present detailed description, the power generation units are exemplified as floating windmills, e.g. comprising a wind turbine for converting wind power into electric power. However, it should be understood that the power generation units may equally well be e.g. floating solar power modules, or floating wave or tidal power modules arranged offshore in a floating formation.

Figure 1:
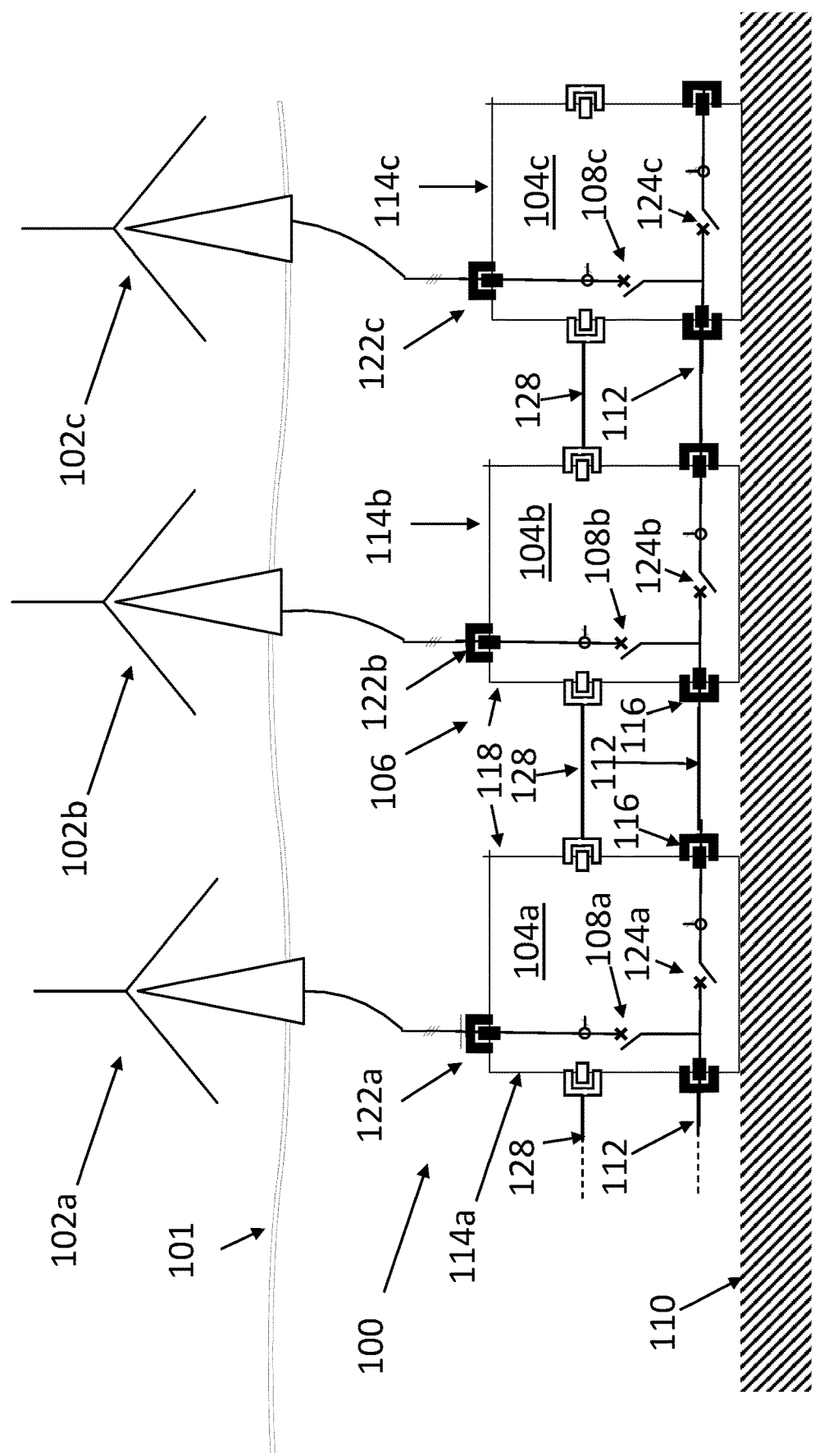
FIG. 1 conceptually illustrates an example power collection system according to embodiments of the invention.

FIG. 1 conceptually illustrates a power collection system 100 for subsea transfer of power from offshore power generation units 102a-c.

The system 100 comprises a set of power extender modules 104a-c being independently arrangeable subsea in a local grid 106. Subsea is understood to be below sea level 101 submersed in water. The power extender modules 104a-c each being connectable with a respective one of the offshore power generation units 102a-c. In this way, the power extender modules 104a-c can collect electrical power from the respective offshore power generation unit 102a-c. The set of power extender modules 104a-c are configured to be electrically series connected in the local grid 106 being connectable with a power consumer. Various types of power consumers are conceivable such as onshore power grids or hubs, offshore power grids or hubs, offshore rigs in need of electrical power, etc. A power consumer may thus be an entity that receives power and distributes the power further, or a direct consumer of the power, or a power storage such as a battery.

Further, each subsea power extender 104a-c optionally comprises switching circuitry 108a-c for controllably connecting the associated power generation unit to the local grid 106. The switching circuitry 108a-c may be a high voltage switchgear.

As conceptually illustrated in FIG. 1, the power extender modules 104a-c are configured to be arranged on the seabed 110. In other words, the power extender modules 104a-c may be submersed in the water and placed on the seabed where it is connected to the local grid 106, whereby the associated windmill 102a-c is connectable to the local grid 106 via the respective power extender module 104a-c. The power extender modules 104a-c are connected to a cable 112 on the seabed 110 in a daisy chain configuration which advantageously reduces the amount of cables needed for installing further windmills to the farm of windmills. The power extender modules are connected as a T-connector in the local grid 106.

Further, the power extender modules comprise a further switch 124a-c for breaking the series connection to neighboring power extenders. This allows for controllably connecting a power extender module to the local grid and for controllably disconnecting a power extender module from the local grid. This facilitates for extending the system 100 with further power generation units, and also for maintenance of the power extender module.

With the herein proposed power collection system and power extender module, the required length of highly expensive dynamical sea cables for connecting floating turbines is reduced, and consequently reduces or even eliminates the need for dynamic export cables at high voltages, e.g. above 66 kV, which is not available at present.

Further, by the provision of the subsea arrangeable power extender modules the installation time after a wind turbine has arrived at the wind park until it can be commissioned is reduced. A power extender module is added to the system and connected to the series connected local grid using the wet side connections and the further switch 124a-c. Once the power extender module is connected to the local grid, the switching circuitry 108a-c is controlled to connect the wind turbine to the system.

Further, the downtime on existing wind power production is reduced when extending a system with additional wind turbines.

Still further, embodiments of the invention advantageously provide the possibility to disconnect individual wind-turbines, e.g. during installation, commissioning, fault handling, maintenance and decommissioning.

In addition, embodiments of the present invention may remove the need for high voltage switchgears integrated in the wind-turbines, which otherwise may need to be customized to a specific turbine design. Turning again to FIG. 1, the power extender modules 104a-c comprise a respective enclosure 114a-c for accommodating the switching circuitry 108a-c. The enclosures 114a-c ensure that the switching circuitry can operate reliable in the water submersed environment. Thus, the enclosure is adapted to allow for subsea operation of the power extender module.

The enclosures comprise electrical connections 116 (only two are numbered) on a wet side 118 of the enclosures, here only denoted on enclosures 114a-b for electrical connection between the power extender modules 104a-b via a subsea cable 112 arrangeable on a seabed 110. Such electrical connections on the wet side are conceptually shown on each of the power extender modules 104a-c. The wet side 118 is the side facing the water side, opposite the inside of the enclosure where the switching circuitry 108a-c is located. The power extender modules 104a-c are thus independent modules arrangeable on the seabed 110.

The enclosures can be configured in various ways to ensure the proper environment for the equipment arranged therein. For example, the enclosures may be oil-filled, or adapted to retain a fixed pressure, or adapted to retain a pressure of 1 atm or adapted to retain vacuum, or nitrogen-filled, oil-filled and pressure compensated, or non-pressure-compensated. The type of enclosure depends on the implementation at hand.

The power extender modules comprise an input connection 122a-c for connection with the associated power generation unit 102a-c. This input connection 122a-c is configured to handle the high power received from the power generation unit 102a-c while at the same time be reliably operative under water. For example, the input connection 122a-c may be a dry-mated electrical connection, or a wet-mateable cable connection for connection with a power generation unit. Various dry-mated electrical connection, and wet-mateable cable connections are known per se in the art and will not be described in detail herein.

Figure 2A:
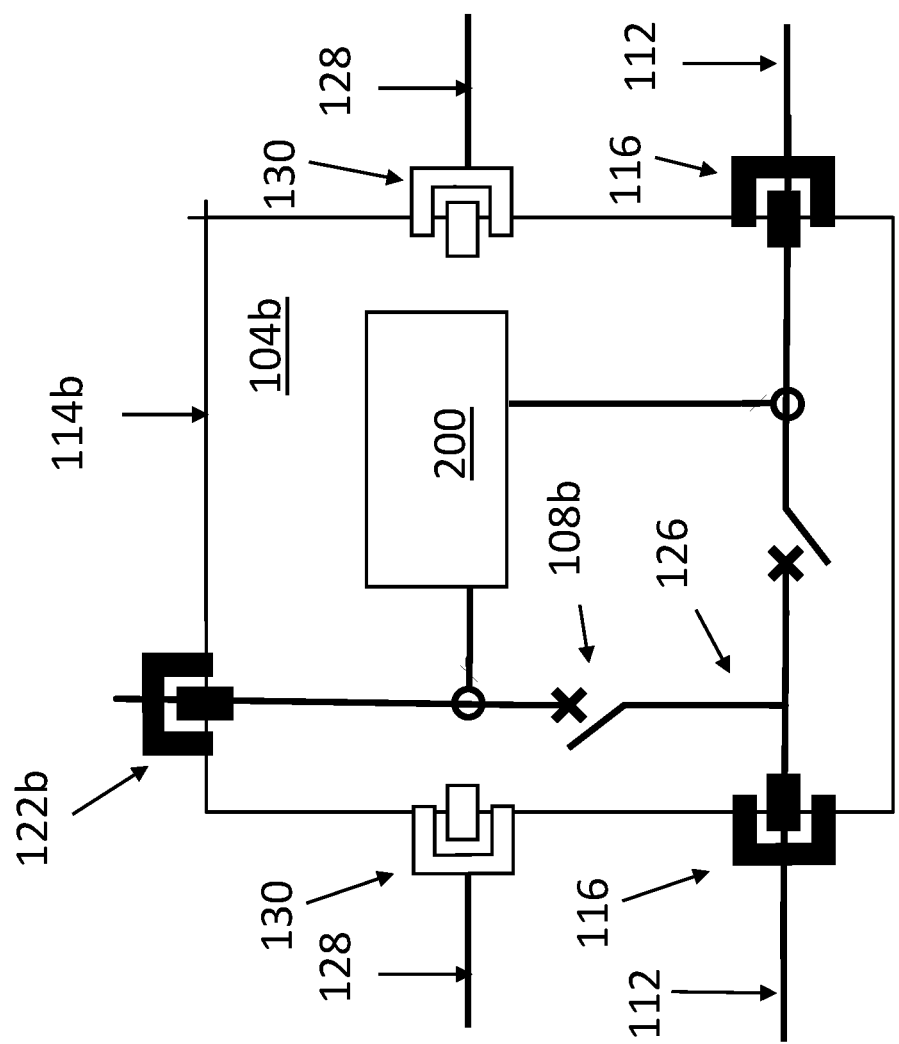
FIG. 2A conceptually illustrates an example power extender module according to embodiments of the invention.

FIG. 2A conceptually illustrates a power extender module 104b, also shown in FIG. 1. The power extender module comprises a T-type busbar connection 126 configured for controllably connecting the input connection 122b to the local grid via the switching circuitry 108b. The T-type busbar 126 is connected to the connections 116 connectable with the seabed cable 112. The switching circuitry 108b connects and disconnects the input connection 122 with the connections 116 and thus with the cable 112. A T-type busbar 126 provides a simple yet robust way to enable the advantageous modular design and configuration of the power extender modules as proposed herein.

Further, the power extender module 104b comprise a communication and control circuit 200 for controlling the switching circuitry to connect the associated power generation unit 102b to the local grid 106, and for controlling the switching circuitry to disconnect the associated power generation unit 102b from the local grid 106. Further, the communication and control circuit 200 is configured to return status information and diagnostic data to e.g. an operator center. The communication and control circuit may comprise a control unit that is remotely controllable by sending control signals via control lines 128 that reach each of the power extender modules 104a-c of the local grid 106. Thus, an operator e.g. on shore, or on a vessel, may remotely disconnect a power generation unit from the system via the control unit controllable by control signals transmitted on the control signal lines 128 and input through wet-mateable or dry-mated connections 130 for the control signal lines 128, and request and receive e.g. measurement and diagnostic data from the power extender module.

Further, the power extender module 104b may comprise control and measurement equipment for performing diagnostic measurements of the power extender module and the associated power generation unit 102b. Further, the power extender module 104b may comprise relay protection functionality based on local measurements on the power extender module 104b or the associated power generation unit. Further, overcurrent protection devices, non directional and directional current protection, directional earth fault, may also be included in the power extender module FIG. 2B conceptually illustrates a power extender module 204 according to a further embodiment. Here the power extender module 204 comprises a T-type busbar connection 126 for connecting a power generation unit connected at the input connection 122b to the local grid. The T-type busbar 126 is connected to the connections 116 connectable with the seabed cable 112. A T-type busbar 126 provides a simple yet robust way to enable the advantageous modular design and configuration of the power extender modules. The communication and control circuit 200 may be configured to control a switching circuitry in the power generating units itself to disconnect the associated power generation unit from the local grid.

Figure 2B:
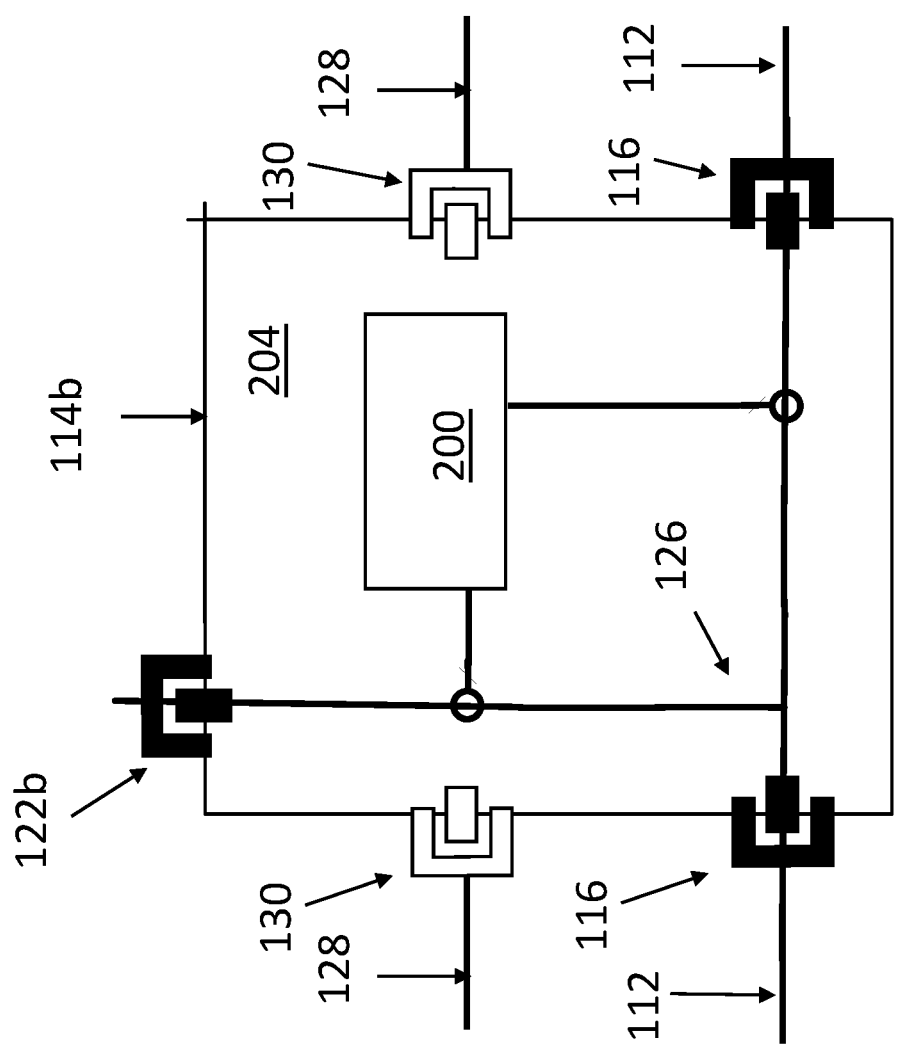
FIG. 2B conceptually illustrates an example power extender module according to embodiments of the invention.

The power extender module 104b conceptually illustrated in FIG. 1 and FIG. 2A-B, are electrically connectable with a single offshore power generation unit 102a-c to collect electrical power from the power generation unit. The power extender module 104b is configured to be independently arranged subsea to be electrically series connected in a local grid of multiple power extender modules 104a-c connectable with a power consumer. The power extender module 104b comprising switching circuitry 108b for controllably connecting the power generation unit 102b to the local grid 106.

Figure 3A:
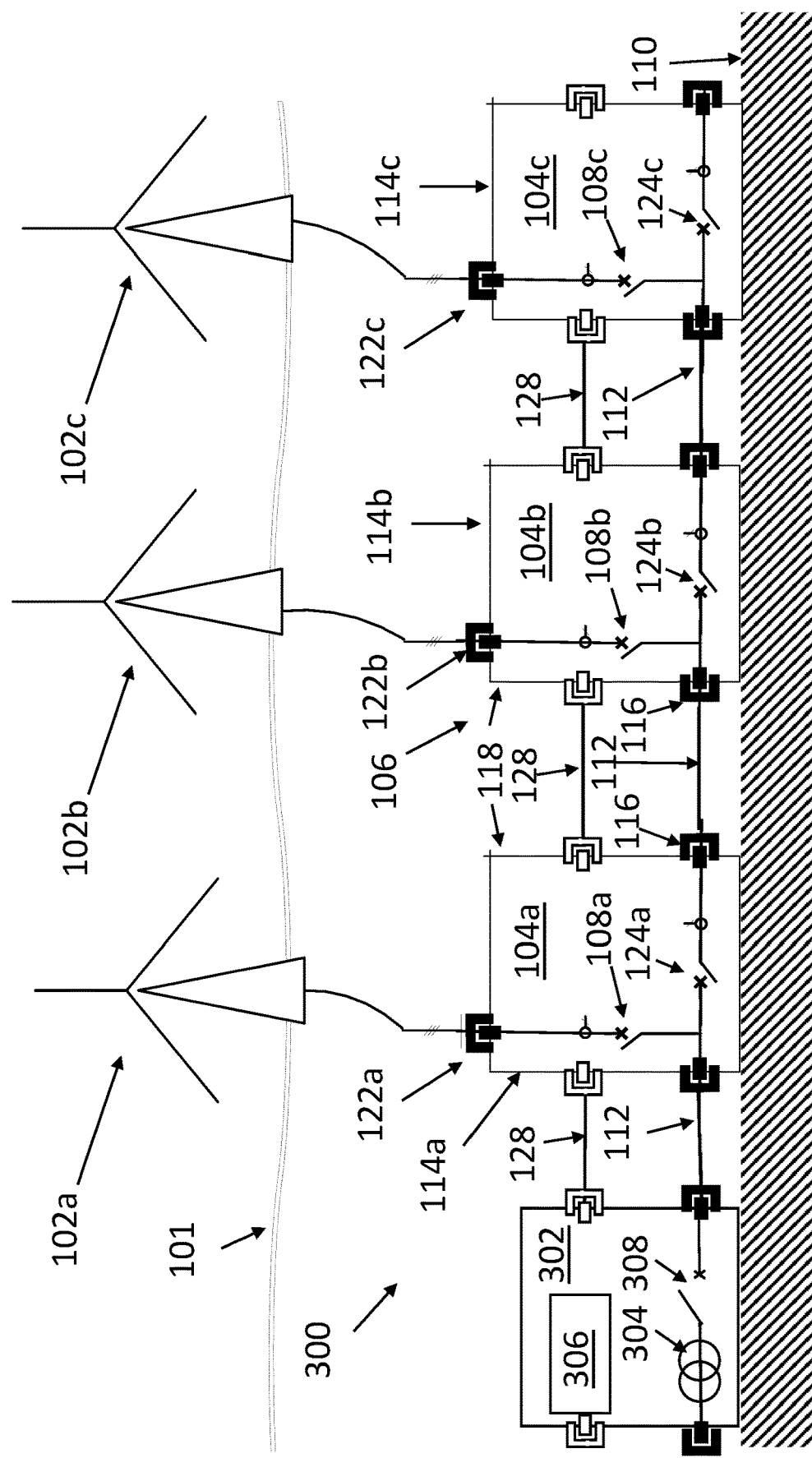
FIG. 3A conceptually illustrates an example power collection system according to embodiments of the invention.

FIG. 3A conceptually illustrates a power collection system 300 further comprising a power hub 302 arrangeable subsea and configured to be connected to at least one local grid 106 of subsea power extender modules for collecting power from the at least one local grid 106 to the power consumer. The power hub 302 comprises a power transformer for converting the power received from the power generation units and provide converted power to the power consumer. Further, the power hub may comprise communication and control circuitry 306 for remotely controlling e.g. measurement and control equipment of the subsea power hub 302 and for controlling switchgear 308 for controlling connection with the local grid 106 and for returning requested status information and diagnostic data to e.g. an operator center.

The power extenders are connectable in a radial topology, or in a ring topology. This will now be discussed in more detail.

Figure 3B:
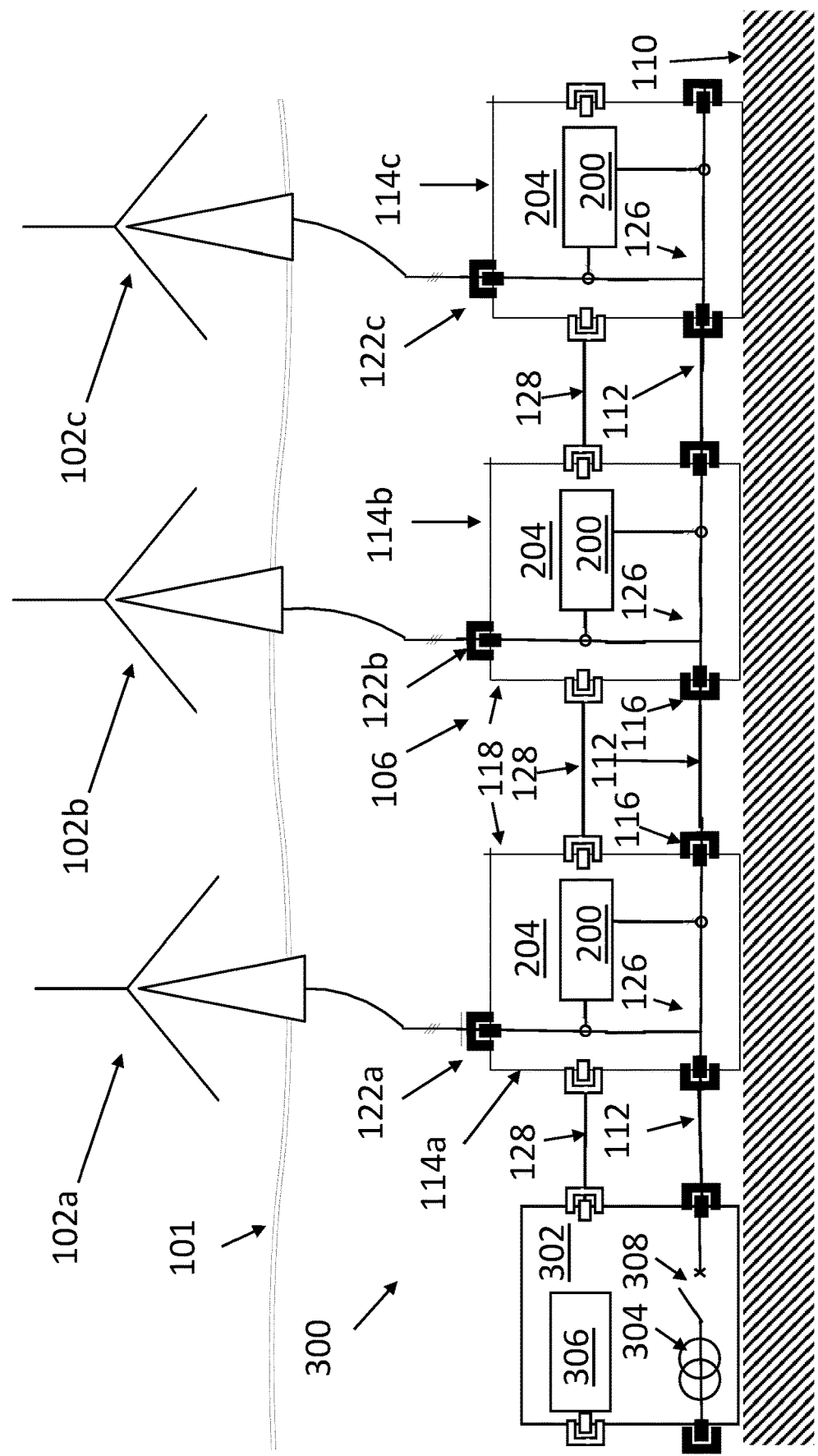
FIG. 3B conceptually illustrates an example power collection system according to embodiments of the invention.

FIG. 3B conceptually illustrates a power collection system 300 further comprising a power hub 302 as in FIG. 3A but here configured to be connected to at least one local grid 106 of subsea power extender modules 204 as shown in FIG. 2B, i.e. power extender modules having a T-type busbar connection 126 for connecting a power generation unit connected at the input connection 122b to the local grid, without the switches 108a-c shown in FIG. 3A. In other words, the difference between FIG. 3A and FIG. 3B is the type of power extender module.

Figure 4A:
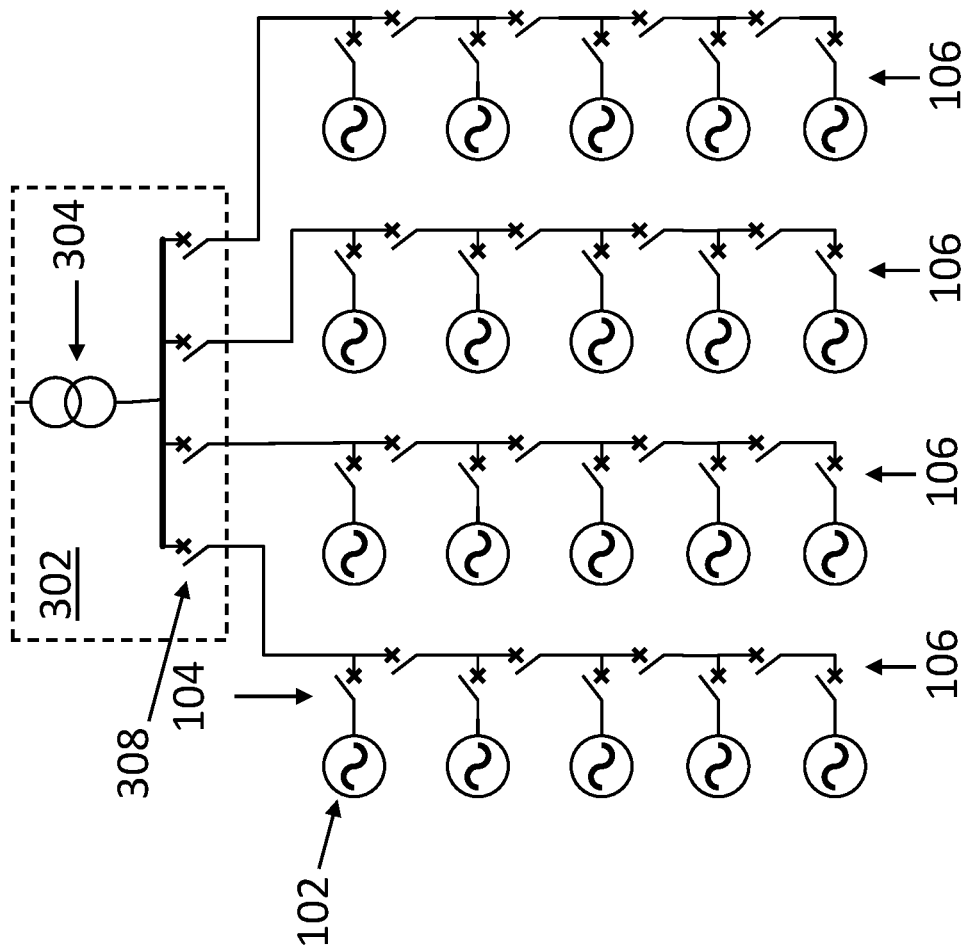
FIG. 4A schematically illustrates power extenders modules arranged in a radial topology.

FIG. 4A schematically illustrates power extenders 102 arranged in four local grids 106, each being in a radial topology connected to a single breaker 308 of a power hub 302. The power hub comprises a high voltage switchboard for selectively electrically connecting a local grid to a power consumer. The switchboard comprises a set of switches 308.

Figure 4B:
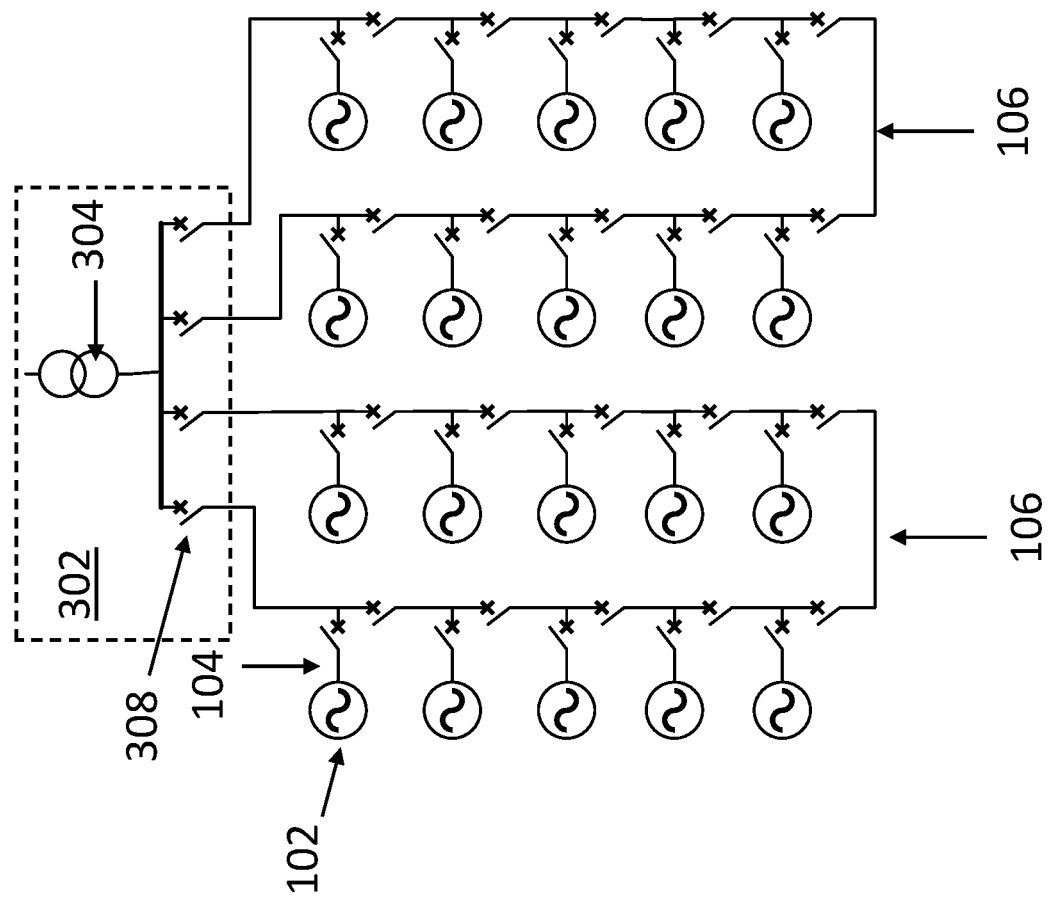
FIG. 4B schematically illustrates power extenders modules arranged in a ring topology.

FIG. 4B schematically illustrates power extenders 102 arranged in two local grids 106, each being in a ring topology connected in a ring to two breakers 308. A ring topology advantageously provides for redundant connections to the power hub 304. The power hub comprises a switchboard for selectively connecting a local grid to a power consumer. The switchboard comprises a set of switches 308.

Figure 5:
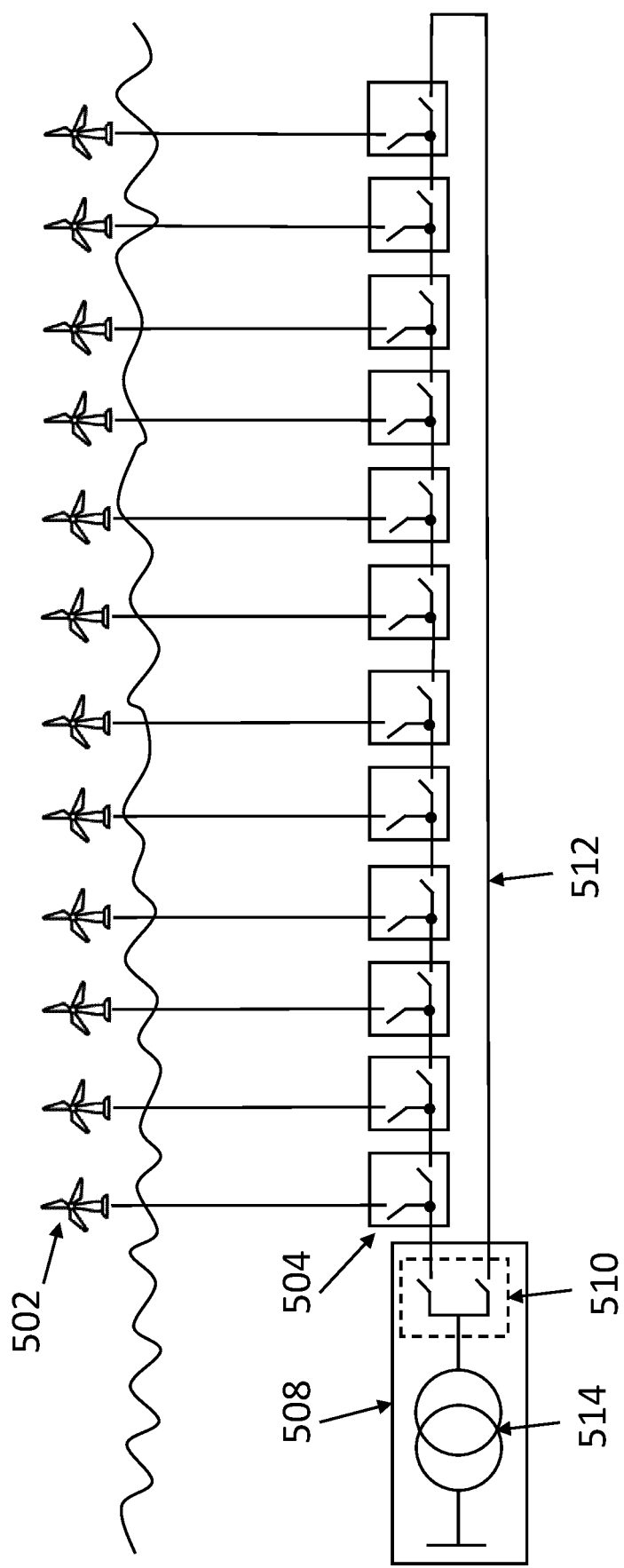
FIG. 5 conceptually illustrates an example power collection system comprising power extender modules connected in a ring topology to a subsea power hub according to embodiments of the invention.

FIG. 5 schematically illustrates a set of floating wind turbines, of which one is denoted 502. Further, subsea power extender modules 504 are arranged on the seabed. Each of the power extender modules 504 is connected with a respective single floating wind turbine 502 as described above. The power extender modules 504 are connected in a ring configuration with one two ends of the seabed cable connected to the subsea power hub 508 at a switch device 510 comprising two switches.

As an example, the set of floating wind turbines 502 may collectively generate 200 MW of power. The subsea power hub 508 comprises a transformer 514 operative at 200 MW capacity for converting to power from the wind turbines 502 to transmission level, typically at approximately 230 kV/503 A at full capacity. The seabed cable 512 may be adapted for transmission at 66 kV. The transformer of the power hub 508 may thus transform the 66 kV from the wind turbines 502 to the 230 kV transmission level.

Figure 6:
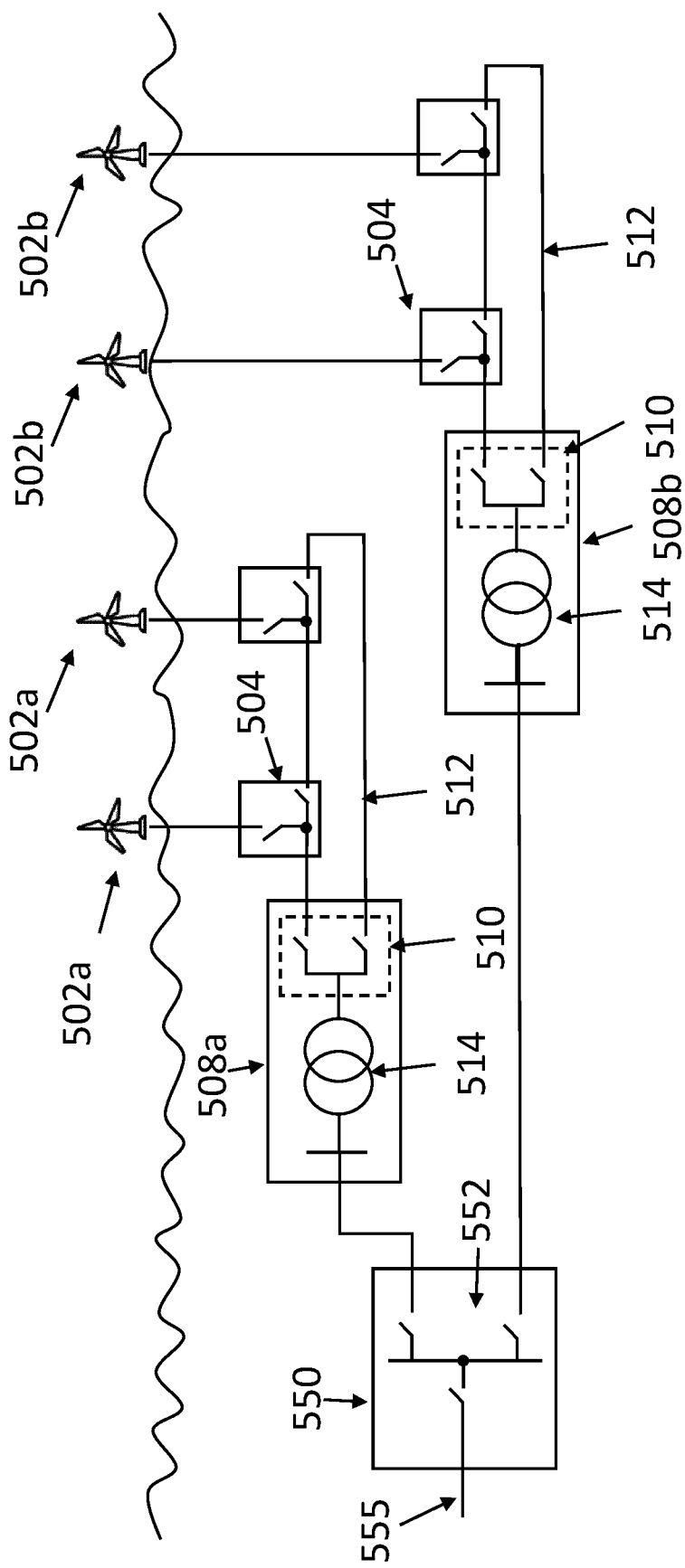
FIG. 6 conceptually illustrates an example power collection system comprising sets of power extender modules connected in a ring topology to a respective subsea power hub connected to a further subsea power hub according to embodiments of the invention.

FIG. 6 schematically illustrates a further example implementation of floating wind turbines 502 and subsea power extenders 504. Each of the depicted turbines 502a-b represents a group of wind turbines each connected to an associated power extender module. The wind turbines 502a-b may each generate about 100 MW at full capacity. In this example, a first set of wind turbines 502a are connected to a first subsea power hub 508a and a second set of wind turbines 502b are connected to a second subsea power hub 508b. As above, the subsea array cables 512 may be adapted to carry 66 kV. The power extenders connected to the first subsea power hub 508a are connected in a ring configuration and the power extenders connected to the second subsea power hub 508a are also connected in a ring configuration.

The transformers 514 of the subsea power hubs 508a-b are connected to a further subsea power hub 550 comprising a high voltage switchboard 552 for selectively connecting and disconnecting the subsea power hubs 508a-b to/from the export cable 555 that may lead to onshore facilities. The further subsea power hub 550 may operate at e.g. 400 MW, 230 kV, 1000 A at full capacity. In other words, the cable 555 is adapted to carry 400 MW at 230 kV/1000 A.

Figure 7:
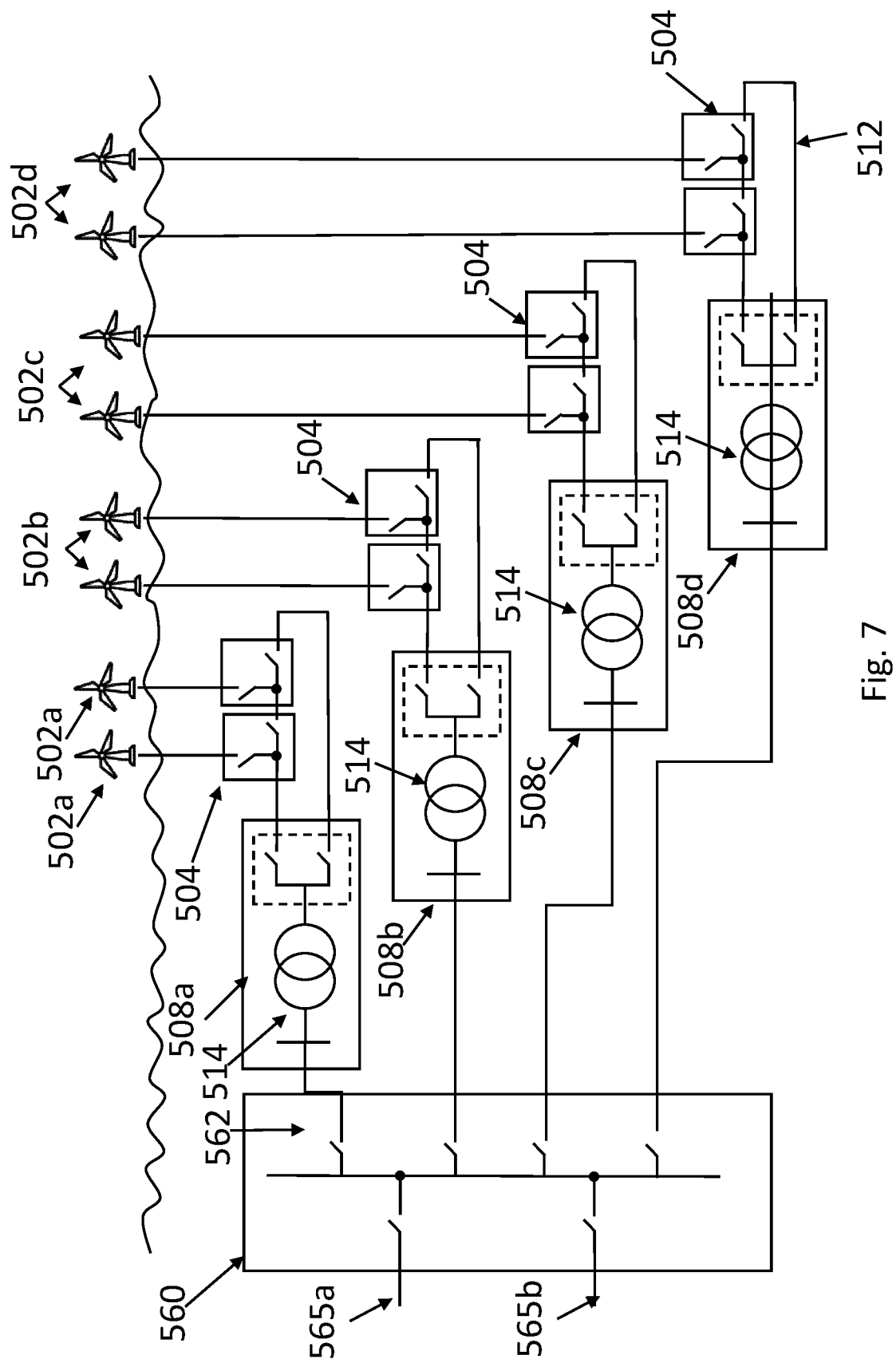
FIG. 7 conceptually illustrates an example power collection or distribution system comprising sets of power extender modules connected in a ring topology to a respective subsea power hub connected to a further subsea power hub according to embodiments of the invention.

The configuration described with reference to FIG. 6 may be extended with further sets of power extender modules in ring configuration. For example, FIG. 7 schematically illustrates a further example implementation of floating wind turbines 502 and subsea power extenders 504. The wind turbines 502a-d may each generate about 100 MW at full capacity. In this example, a first set of wind turbines 502a are connected to a first subsea power hub 508a, a second set of wind turbines 502b are connected to a second subsea power hub 508b, a third set of wind turbines 502c are connected to a third subsea power hub 508c, and, a fourth set of wind turbines 502d are connected to a fourth subsea power hub 508d. As above, the subsea array cables 512 may be adapted to carry 66 kV. The power extenders in each set are connected in a ring configuration.

The transformers 514 of the subsea power hubs 508a-d are connected to a further subsea power hub 560 comprising a high voltage switchboard 562 for selectively connecting and disconnecting the subsea power hubs 508a-d to/from a pair of export cables 565a-b that may lead to onshore facilities. The further subsea power hub 560 may operate at e.g. 800 MW, 230 kV, 2×1000 A at full capacity. In other words, each of the cables 565a-b is adapted to carry 400 MW at 230 kV/1000 A.

Figure 8:
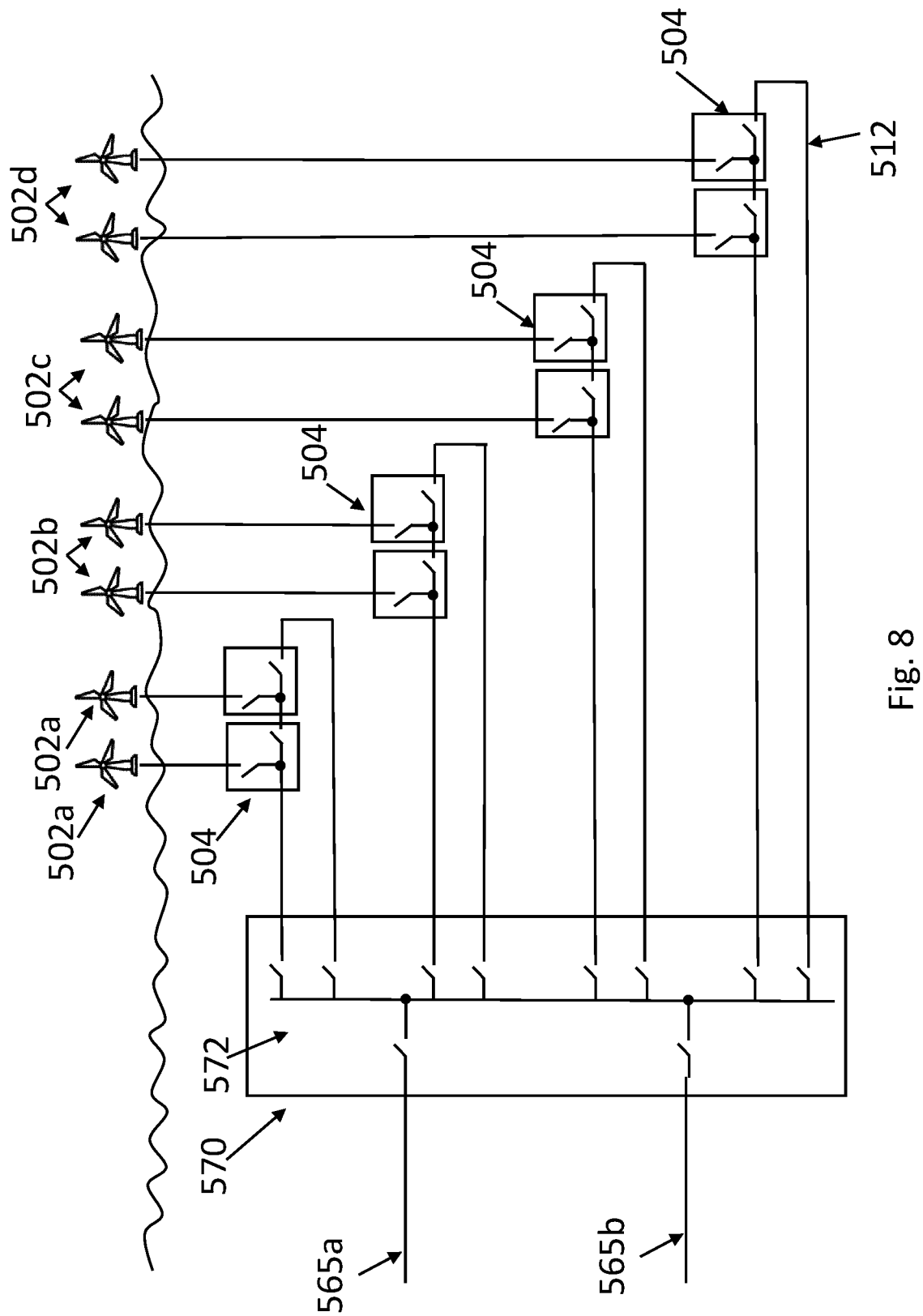
FIG. 8 conceptually illustrates an example power collection or distribution system comprising sets of power extender modules connected in a ring topology to a subsea power hub according to embodiments of the invention.

FIG. 8 is a further example, where all the wind turbines 502a-d are connected via their corresponding power extender module 504 directly to a subsea power hub 570. The subsea power hub 570 comprises a high voltage switchboard 572 for selectively connecting and disconnecting the sets of wind turbines 502a-d to/from a pair of export cables 565a-b that may lead to onshore facilities. The further subsea power hub 570 may operate at e.g. 800 MW, 230 kV, 2×1000 A at full capacity. In other words, each of the cables 565a-b is adapted to carry 400 MW at 230 kV/1000 A. The system in FIG. 8 does not include power transformers, as for example the system in FIG. 7. Thus, the system in FIG. 8 is not limited to the maximum power levels that the power transformers may be rated to. This is advantageous if the local grid of power extenders and wind turbines can operate at transmission level voltages.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Communication between devices, control units or other modules described herein may be wireless or hardwired, based on electrical and/or fiber-optical communication as is suitable and implement a suitable protocol for the specific case.

Switches and switching circuitries herein may include e.g. circuit breakers and/or no-load disconnectors, etc., depending on the specific implementations at hand.

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A power collection system for subsea collection of power from offshore power generation units, the system comprising:
   a set of power extender modules configured to be independently arranged subsea on a seabed in a subsea local grid during operation, each power extender module including:
   switching circuitry, and
   a waterproof enclosure accommodating the switching circuitry for subsea operation, the waterproof enclosure being configured to prevent water surrounding the waterproof enclosure from reaching the switching circuitry disposed inside the waterproof enclosure,
   wherein each power extender module is connectable with a respective one of a set of offshore power generation units to collect electrical power from the respective offshore power generation unit,
   wherein the switching circuitry of each power extender module is configured to controllably connect the respective offshore power generation unit to the local grid, and
   wherein the set of power extender modules are configured to be electrically connected in series via at least one subsea cable to provide the electrical power to a power consumer.

2. The power collection system according claim 1, wherein the waterproof enclosure of each power extender module comprises electrical connections positioned on a wet side of the waterproof enclosure to connect the power extender modules to each other via the at least one subsea cable.

3. The power collection system according to claim 2, wherein the enclosures are:
   oil-filled,
   adapted to retain a fixed pressure,
   adapted to retain a pressure of 1 atm or adapted to retain vacuum,
   nitrogen-filled, oil-filled and pressure compensated, or
   non-pressure-compensated.

4. The power collection system according to claim 2, wherein each power extender module comprises an input connection for connecting with the respective offshore power generation unit,
wherein each power extender module includes a T-type busbar connection configured to connect the input connection to the local grid.

5. The power collection system according to claim 2, wherein each power extender module comprises communication circuitry and control circuit, which control the switching circuitry to connect the respective offshort power generation unit to the local grid and to disconnect the respective offshore power generation unit from the local grid.

6. The power collection system according to claim 2, further comprising a power hub configured to be connected to the local grid of the subsea power extender modules for collecting the electrical power from the local grid.

7. The power collection system according to claim 2, wherein the power extender modules each comprise a further switch for breaking the series connection to neighboring power extenders.

8. The power collection system according to claim 1, wherein the waterproof enclosures are:
oil-filled,
adapted to retain a fixed pressure,
adapted to retain a pressure of 1 atm or adapted to retain vacuum,
nitrogen-filled, oil-filled and pressure compensated, or non-pressure-compensated.

9. The power collection system according to claim 1, wherein each power extender module comprises an input connection for connecting with the respective offshore power generation unit,
wherein each power extender module includes a T-type busbar connection configured to connect the input connection to the local grid.

10. The power collection system according to claim 1, wherein each power extender module comprises communication circuitry and control circuit, which control the switching circuitry to connect the respective offshore power generation unit to the local grid and to disconnect respective offshore power generation unit from the local grid.

11. The power collection system according to claim 1, further comprising a power hub configured to be connected to the local grid of the subsea power extender modules for collecting the electrical power from the local grid.

12. The power collection system according to claim 11, wherein the power hub comprises a power transformer that converts the electrical power received from the offshore power generation units and provides the converted power to the power consumer.

13. The power collection system according to claim 1, wherein the power extender modules each comprise a further switch for breaking the series connection to neighboring power extenders.

14. The power collection system according to claim 1, wherein the power extender modules are connectable in a radial topology or a ring topology.

15. The power collection system according to claim 1, wherein each power extender module comprises a dry-mateable connection or a wet-mateable connection for connecting to the respective offshore power generation unit.

16. The power collection system according to claim 1, wherein the power extender modules are configured to be arranged on the seabed.

17. A power extender module electrically connectable with a single offshore power generation unit to collect electrical power from the power generation unit, the power extender module is configured to be independently arranged subsea during operation and to be electrically connected in series in a subsea local grid of multiple power extender modules, the power extender module comprising:
switching circuitry configured to controllably connect the power generation unit to the local grid, and
a waterproof enclosure accommodating the switching circuitry for subsea operation, the waterproof enclosure being configured to prevent water surrounding the waterproof enclosure from reaching the switching circuitry disposed inside the waterproof enclosure.

* * * * *